Figure 1:
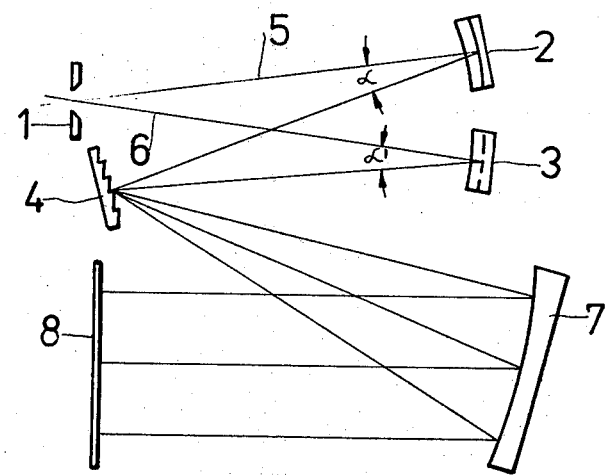

United States Patent [19]

Mohr

[11] 4,289,401

[45] Sep. 15, 1981

[54] OPTICAL SYSTEM FOR SPECTRAL DEVICES

[75] Inventor: Joachim Mohr, Jena-Lobeda, German Democratic Rep.

[73] Assignee: Jenoptik Jena GmbH, Jena, Jena, German Democratic Rep.

[21] Appl. No.: 106,069

[22] Filed: Dec. 26, 1979

[30] Foreign Application Priority Data

Jan. 3, 1979 [DD] German Democratic Rep. ... 210307

[51] Int. Cl.$^3$ .................................................. G01J 3/18
[52] U.S. Cl. ..................................... 356/305; 356/328
[58] Field of Search ............... 356/305, 328, 323–326, 356/331–334

[56] References Cited

U.S. PATENT DOCUMENTS

| Re. 26,053 | 7/1966 | Cary | 356/333 |
|---|---|---|---|
| 2,453,164 | 11/1948 | Swings | 356/305 |
| 3,836,237 | 9/1974 | Egan et al. | 356/330 X |

Primary Examiner—F. L. Evans

[57] ABSTRACT

The invention relates to an optical system for spectral devices which improves the resolution of a spectral line image up to the edge portions by use of at least two collimators. The collimators are adjacently located in direction of dispersion and differently inclined relative to the plane of dispersion of the optical system. The produced spectral sections are imaged on a detector where the number of the collimators used depends on the number of spectral sections.

1 Claim, 3 Drawing Figures

OPTICAL SYSTEM FOR SPECTRAL DEVICES

The invention concerns an optical system for spectral devices constituted of at least one light entrance opening and two adjacent collimators, one dispersing member, one camera optic and at least one detector arranged in the meridional focal plane of the optical system. The previous optical systems having plane grating reflector optics or lens-prism-optics only are provided with one light entrance opening and only one collimator reflector and one collimator objective, respectively.

Said collimator detects an entire bundle of rays originating from the light entrance opening and directs said bundle as parallel rays to a grating or a prism which is the dispersing member. The entire spectral range is detected by a photoplate which operates as a detector.

Furthermore, optical systems are known making use of the so-called crossing dispersion.

Two different spectral orders are adjacently imaged on a detector by a second dispersing member in a predetermined sequence, the images having a predetermined distance relative to each other. The above arrangements are disadvantageous since they are expensive due to the two dispersing members required, apart from the fact that the spectral lines are of increasingly low definition towards the edge portions of a spectral range when the center of the meridional focal plane is compensated for coma, as generally done.

Still another known multi-channel analyzing device for liquid chromatography spectrally investigates the composition of a sample by using a plurality of light beams of equal wavelength.

This device is disadvantageous since it only permits the investigation of twice the same spectral range at one time.

It is an object of the present invention to obviate the above disadvantages.

It is a further object of the present invention to provide an optical system which permits particularly for the Czerny-Turner spectrograph the investigation of a spectral range entirely, that is up to the edge portions of a spectral image with respect to resolution of the spectral lines without any drawbacks as to light power, and at short focal lengths and at a comparatively wide operational range.

These and other objects are realised in an optical system for spectral devices including at least one light entrance opening, two adjacently located collimators, a dispersing member, a camera reflector and at least one detector arranged in the meridional focal plane of the optical system.

The collimators are adjacently located with respect to the dispersion direction of the dispersing member and are inclined relative to each other at right angles to the dispersion direction.

Thus, under the condition of equal dispersion in an analyzing operation, a considerably wide spectral range is subdivided into at least two spectral sections and is imaged upon a two-dimensional detector, for example, a photo-plate, the images can be adjacently produced on one detector or at several detectors associated to the different spectral images. Advantageously, each of the individual light bundles enters the optical system through one respective light entrance opening associated to said individual beam, instead of one light entrance opening provided for the entire light bundle.

The inventional system does not only improve the compensation for coma but also for astigmatism, since the distance between the sagittal focal plane to the meridional focal plane is reduced particularly at the edge portions of the spectral sections. Thus a particular favorable effect upon stepped filtered exposures and with rotating sector discs, respectively is obtained.

The radiation which impinges upon the individual collimators can be filtered through various absorption filters to eliminate undesired spectral orders. Thus it is feasible to record different spectral orders in the individual spectral sections. Due to the different tilt of the collimators relative to the grating and to the camera reflector, respectively, multiple reflections and, hence, interfering spectra are eliminated in the individual spectral sections.

Furthermore, the width of the camera reflector and of the two-dimensional detector is reduced, as well as the mounting means therefore required.

Thus a compact and simple construction is feasible. And finally, a compensation for astigmatism can still be improved or performed by associating cylinder lenses to the collimators.

Figure 2:
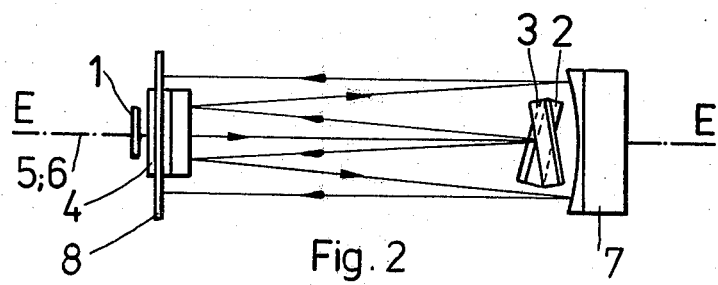
Figure 3:
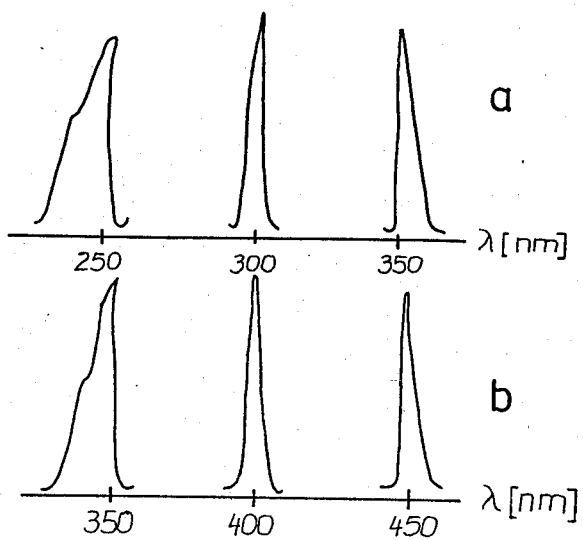

In order that the invention may be more readily understood reference is made to the accompanying drawings which illustrate diagrammatically and by way of example one embodiment thereof and where FIG. 1 is a schematical top view of an optical system, FIG. 2 a lateral view of the system of FIG. 1, and FIG. 3 the spectral line curve taken from two spectral sections.

In FIGS. 1 and 2 a light entrance opening 1 is constituted of a slit followed by two collimator reflectors 2, 3 which are slightly inclined relative to each other and which include angles other than right ones with the dispersion plane E—E.

The light from a not shown light source produces two light bundles represented by their axial beams 5, 6 which impinge through said slit 1 upon the reflectors 2 and 3, respectively, where they are reflected and directed, parallel relative to each other, upon different portions of a grating 4, which serves to disperse said two light bundles 5, 6. The latter, after spectral decomposition, are directed to a camera reflector 7 which reflects the beams 5, 6 to and focusses the latter upon a two-dimensional detector 8.

Since the two light bundles are of different wavelengths they impinge at different heights, upon the detector 8, and are represented as adjacently located spectral sections a and b (FIG. 3) thereupon.

The most favorable compensation for coma in the two spectral sections can be obtained by a respective selection of the collimator reflector 2, 3 curvature and of the angles α and α'.

The invention is not restricted to two collimator reflectors, since the number of reflectors can be adapted to the number of spectral sections which have to be adjacently imaged upon the two-dimensional detector.

I claim:

1. An optical system for spectral devices, comprising subsequently in a path of rays and in mutual alignment
   at least one light entrance opening,
   at least two collimating reflectors for splitting said path of rays,
   one dispersing member for the splitted path of rays,
   said collimating reflectors being adjacently located in the dispersion direction of said dispersing member and inclinedly arranged relative to each other and at right angles to the dispersion direction, said dispersing member for producing at least two sections of a spectrum in continuation relative to each other, a camera optics, and at least one detector arranged in the meridional focal plane of the optical system said camera optics for imaging said sections onto said detector.

* * * * *